Jan. 28, 1969

B. HERSHENOV 3,425,001

DIELECTRICALLY-LOADED, PARALLEL-PLANE
MICROWAVE FERRITE DEVICES

Filed May 31, 1966

Sheet __1__ of 5

INVENTOR.
BERNARD HERSHENOV
BY
Edward J Norton
Attorney

INVENTOR.
BERNARD HERSHENOV

Fig. 12.
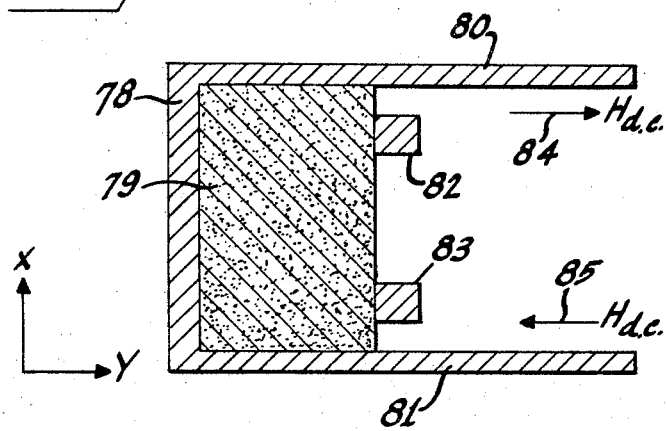
Fig. 13.
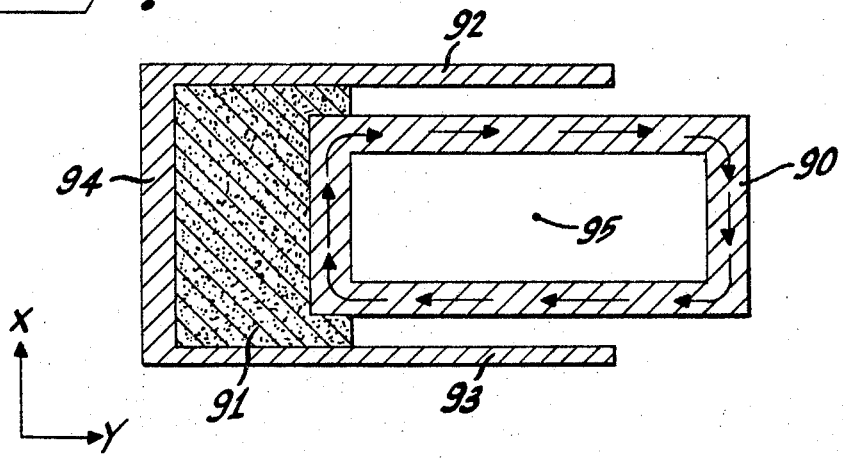
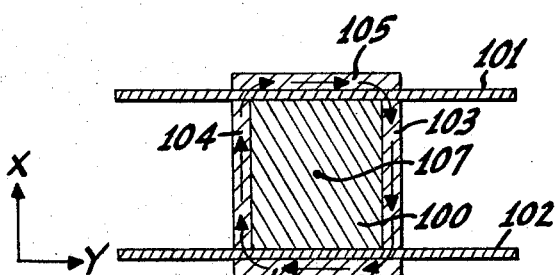
Fig. 14.
INVENTOR.
BERNARD HERSHENOV
BY
Edward J. Norton
Attorney United States Patent Office 3,425,001
Patented Jan. 28, 1969

3,425,001
DIELECTRICALLY-LOADED, PARALLEL-PLANE
MICROWAVE FERRITE DEVICES
Bernard Hershenov, Kendall Park, N.J., assignor to Radio
Corporation of America, a corporation of Delaware
Filed May 31, 1966, Ser. No. 553,994
U.S. Cl. 333—1.1                    16 Claims
Int. Cl. H01p 1/32

ABSTRACT OF THE DISCLOSURE

A transmission line is provided comprising a rectangular piece of low loss relatively high dielectric material disposed between two parallel conducting planes or plates so that an air space is left between the two plates on each side of the dielectric material. The cross sectional dimensions and dielectric constants are selected so that upon the application of an electromagnetic wave, R-F energy in either the $TE_{10}$ or $HE_{11}$ modes is propagated along this transmission line. Ferrite material properly biased with a D.C. magnetic field and placed near the dielectric-air interface can be arranged to act on the electromagnetic wave propagated along the transmission line to provide different types of ferrite microwave devices.

---

This invention relates to devices of the type intended for use primarily at microwave frequencies, and in particular to improved ferrite devices employing an open-sided transmission line.

It is an object of the present invention to provide improved microwave devices of relatively small size and of light-weight construction.

Another object of the present invention is to provide improved ferrite devices characterized by dielectrically-loaded parallel-planes.

Considerable attention has been directed toward reducing the size and weight of microwave devices. Various improvements over conventional, bulky waveguide structures have been suggested. The strip transmission line has been developed for microwave networks in recent years. This technique includes a narrow rectangular center conductor surrounded by dielectric and spaced between two highly conducting ground planes. In a different technique, a transmission line can be formed by mounting a rectangular strip of dielectric material between two conducting planes and thereby forming with air between the planes a duo-dielectric, parallel-plane transmission line, whereby electromagnetic wave energy in transverse electric mode or hybrid modes is propagated along the transmission line upon the application thereto of an electromagnetic field. The dominant mode of such a line is very similar to the $TE_{10}$ mode in rectangular waveguides but in this line there is no low frequency cut-off as in the rectangular waveguide.

In accordance with the teaching of the present invention, there is provided a rectangular piece of low loss, relatively high dielectric material disposed between two parallel, conducting planes or plates but occupying less than the entire area between the two planes so that an air space or place for lower dielectric material is left between the two planes on each side of the relatively higher dielectric material. The cross-sectional dimensions and the dielectric constant of the high dielectric material are selected so that, upon the application of an electromagnetic wave, radio frequency (R-F) energy propagated along the transmission line has a longitudinal electromagnetic field component. The electromagnetic wave is propagated along the transmission line in and near the high dielectric material which acts to hold the wave tightly to the line and reduce radiation from the open sides of the line. Ferrite material properly biased with a direct current (D.C.) magnetic field and placed near the interface between the high dielectric material and air or low dielectric material can be arranged to act on the electromagnetic wave propagated along the transmission line to provide different types of ferrite microwave devices having the advantage of size and weight, for example, over conventional waveguide structures.

The above mentioned and other features and objects of this invention will become more apparent by reference to the following description taken in conjunction with the accompanying drawings, wherein:

FIG. 12 is a cross-sectional view of a trough waveguide supporting a hybrid $HE_{11}$ mode;

FIG. 13 is a cross-sectional view of a trough waveguide with latching ferrite material for use with fundamental hybrid mode $HE_{11}$;

FIG. 14 is a cross-sectional view of a dielectrically-loaded, parallel-plane transmission line with latching ferrite material for use with fundamental $TE_{10}$ mode;

Figure 1:
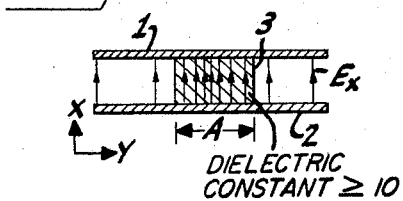
FIG. 1 is a cross-sectional view of a dielectrically-loaded, parallel-plane transmission line illustrating the electric field lines in the dominant $TE_{10}$ mode.

A waveguide transmission line can be formed by mounting a dielectric strip having a higher dielectric constant than that of air, for example, between two conducting planes, whereby the dielectric strip is flanked on each side by air or lower dielectric material. Upon the application of an electromagnetic wave, electromagnetic wave energy in a mode of the transverse electric type or hybrid type is propagated along the transmission line. A transmission line so formed is generally referred to herein as a dielectrically-loaded, parallel-plane transmission line. In the past, such dielectrically-loaded, parallel-plane transmission lines have been proposed for possible use in millimeter waveguides because the dimensions could be larger at millimeter waves than those of corresponding rectangular waveguide structures and because such transmission lines have reasonable power handling ability. A disadvantage in the use of such transmission lines is that they are characterized by dielectric constants which are relatively low, dielectric constants of from two to six compared to the dielectric constant of air, and the R-F field was only loosely bound to the dielectric. Because the wave was loosely bound, any obstacles or discontinuities promoted radiation from the open sides of the line.

Dielectrically-loaded, parallel-plane transmission line microwave devices are proposed herein in which a dielectric material is used having a dielectric constant of at least ten compared to the dielectric constant of air so that more of the energy is located in the high dielectric material and a propagating electromagnetic wave is more tightly bound to the line and, in fact, the field decays exponentially away from the dielectric and little R-F energy is located a short distance from the dielectric. If the spacing between the planes and the corresponding height of the dielectric material is made small in size compared with the wavelength in the dielectric material for the R-F energy applied to the transmission line, the analysis of the field components may be accomplished by assuming no field variations between the planes in the direction perpendicular to the parallel planes. Under these conditions, transverse electric type electromagnetic modes are present. Transverse magnetic modes cannot exist in this configuration. For the transverse electric (TE) modes, the field components are not functions of the transverse variable associated with the direction perpendicular to the plane of the two conducting planes or plates but in the dielectric region they are the sine or cosine functions of the transverse variable associated with the direction parallel to the conducting planes. If the variation is determined by a sine function as measured with respect to the center of the dielectric medium, the corresponding modes are called antisymmetrical modes. If the variation is cosinusoidal with respect to the center of the dielectric medium, the modes are symmetrical modes. By properly choosing the width of the dielectric material placed along the centerline of the parallel planes, the antisymmetrical $TE_{20}$ mode is cut off and a dominant $TE_{10}$ mode is supported by the line. This $TE_{10}$ mode is similar to the $TE_{10}$ mode in rectangular waveguide, except in this type of transmission line there is no low frequency cutoff for the $TE_{10}$ mode.

Figure 2:
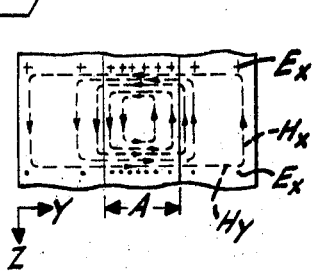
FIG. 2 is a top view illustrating the magnetic field lines of a dielectrically-loaded, parallel-plane transmission line in the dominant $TE_{10}$ mode.
Figure 3:
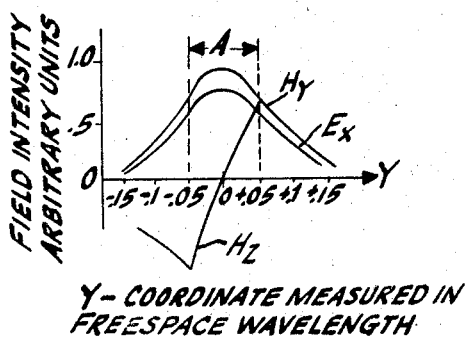
FIG. 3 is a graph showing the relative magnitudes of the field components of the dominant $TE_{10}$ mode of a parallel-plane transmission line.

FIGS. 1 and 2 show an example of the field configurations of the dominant or $TE_{10}$ mode of a dielectrically-loaded, parallel-plane transmission line. FIG. 1 is a cross-sectional view of a dielectrically-loaded, parallel-plane transmission line operated in the dominant ($TE_{10}$) mode illustrating the transverse electric field lines $E_x$ located between the parallel plates 1 and 2 at one position in the transmission line at one instant in time. FIG. 1 also illustrates the high concentration of the transverse electric field lines $E_x$ in the region 3 of the high dielectric material positioned between the parallel conducting plates 1 and 2. The spacing between the conducting plates 1 and 2 is made sufficiently small so that there is no field variations between the conducting plates that are perpendicular to the plane of the plates. FIG. 2 is a top view of a portion of the dielectrically-loaded, parallel-plane transmission line operated in the dominant ($TE_{10}$) mode illustrating the transverse electric field lines $E_x$ and the magnetic field lines H at one instant in time. FIG. 2 also illustrates that the magnetic field lines H have field components in the transverse direction ($H_y$) and in the longitudinal direction or direction of propagation ($H_z$). FIG. 3 illustrates the relative field magnitudes of the transverse electric $E_x$ and the magnetic $H_y$ and $H_z$ field components in the cross-section.

Figure 4:
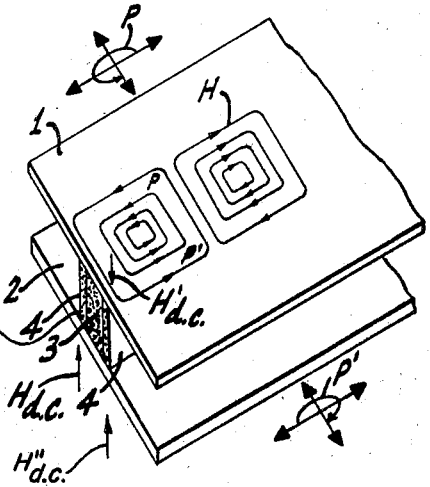
FIG. 4 illustrates the magnetic field contours parallel to the broad face of a dielectrically-loaded, parallel-plane transmission line and the resultant polarization of the magnetic field lines off the longitudinal center axis for propagation of electromagnetic waves from left to right.

FIGS. 1, 2 and 3 indicate that the field intensities $E_x$, $H_y$, $H_z$ (where $x$ is the dimension between plates 1 and 2, $y$ is the dimension across the short axis of the line, and $z$ is the dimension along the long axis of the line) are located principally and $E_x$ and $H_y$ are cosinusoidal in the region A containing the high dielectric material 3 (dielectric constant of ten or more) and that the field outside the dielectric decays exponentially outside the dielectric so that little R-F energy is located at a short distance away from this region. Since the frequency can be reduced coupled with the fact that this $TE_{10}$ mode has no low frequency cutoff, the dielectrically-loaded, parallel-plane transmission line becomes particularly attractive in the L-to-X band frequency region where small size and low weight is desirable. The dielectrically-loaded, parallel-plane ferrite devices described in this application are applicable for use in thin film technology and integrated circuits where conventional waveguides are too bulky. FIG. 4 shows the magnetic field contours in a dielectrically-loaded, parallel-plane transmission line and the resultant polarization of the magnetic field lines off the longitudinal center axis for propagation of an electromagnetic wave from left to right. Note that not only are the R-F fields of the $TE_{10}$ mode very similar to the dominant $TE_{10}$ mode in rectangular waveguide, but that the magnetic field lines at the dielectric-air interface are almost circularly polarized. FIG. 4 shows that at any point on opposite sides of the high dielectric material 3, the R-F magnetic field vectors may be represented as the sum of two elliptical or almost circular polarizations of opposite senses. An observer at point P sees a magnetic field which is rotating counterclockwise as he observes the wave traveling from left to right. If he moves to point P' on the other side of the guide, he observes a magnetic field rotating clockwise as the wave travels from left to right.

Assume now that strips 4 of ferrite material are placed near the high dielectric-air interface and that this ferrite material 4 is biased by suitable means (not shown) with a D.C. magnetic field ($H_{D.C.}$). In the presence of an applied D.C. magnetic field ($H_{D.C.}$) and upon the application of electromagnetic energy, the R-F magnetic field vectors for one elliptical or almost circular polarization will precess in the same direction as the material precession while the other almost circular polarization is in the opposite direction. The two different directions give rise to different R-F permeabilities associated with two waves propagating in opposite directions. Various types of microwave components in rectangular waveguide have been produced by taking advantage of this difference in R-F permeability. Therefore, devices similar to microwave components in rectangular waveguide which employ ferrite materials can now be produced by dielectrically-loaded, parallel-plane transmission lines using the techniques described and claimed in this application.

Figure 5:
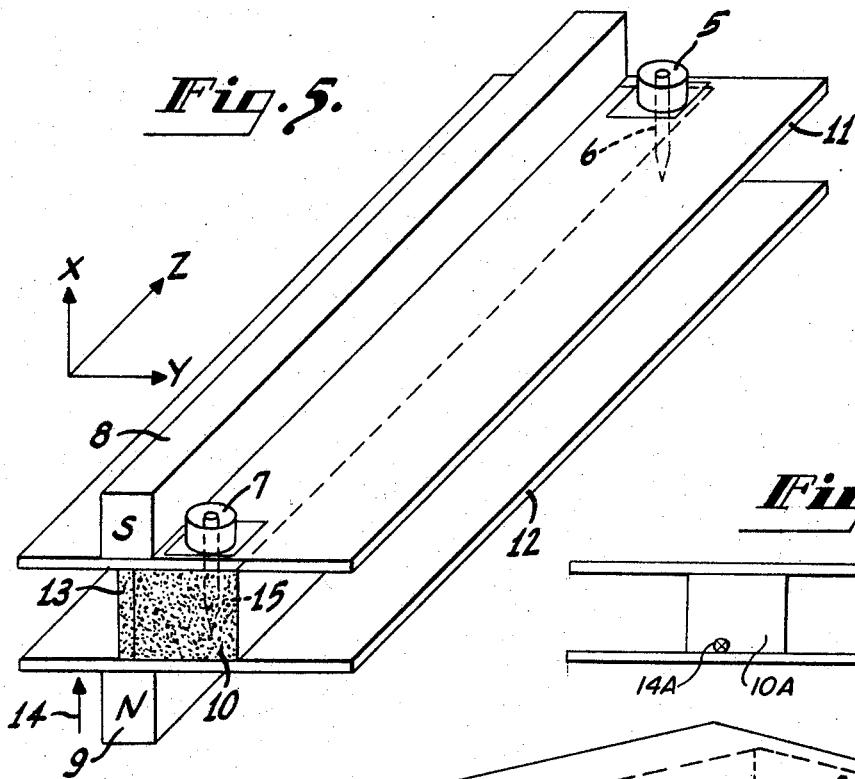
FIG. 5 is a perspective view of a dielectric-loaded, parallle-plane differential phase shifter.

FIG. 5 shows a perspective view of a dielectrically-loaded, parallel-plane transmission line for use as a differential phase shifter. A rectangular piece of low loss high dielectric material 10 such as that sold by Emerson & Cummings as Stycast Hi-K which has a loss tangent of 0.002 and a dielectric constant of ten compared to the dielectric constant of air is placed between a pair of parallel copper or other suitable metallic conducting plates 11 and 12 and centered along the center line thereof. The pair of parallel plates 11, 12 may be, for example, 1/32 inch thick. The spacing between the parallel plates 11, 12 is in the $x$-direction and is made small in size compared with the wavelength in the dielectric medium so that one-half wave variation of the field is not possible between the plates. By way of example, for operation at 8.5 gHz, the spacing between the parallel plates 11, 12 is made 0.191 inch using the low loss, high dielectric material Stycast Hi-K. The width of the parallel plates 11, 12 is in the $y$-direction and the propagation of the electromagnetic waves applied to the transmission line is in the $z$-direction. The dimension of the dielectric material 10 in the $y$-direction is made sufficiently small such as 0.141 inch for operation at 8.5 gHz. so as to cut-off the antisymmetrical $TE_{20}$ mode and provide electromagnetic wave propagation only in the symmetrical $TE_{10}$ mode. The dielectric material 10 is placed along the entire length of the transmission line in the z-direction which may be, for example, 3.91 inches. A thin strip of ferrite material 13 such as R4 material sold by General Ceramics of Keasbey, New Jersey, is placed along the entire length (z-direction) covering one side of the dielectric material 10 facing an open side of the transmission line. The term "ferrite" as applied to these devices defines a material which has insulating, magnetic and gyromagnetic properties. The material may be, for example, a ferrite or magnetic garnet. By having a structure where low loss relatively high dielectric material is located near the ferrite, the ferrite phase shifter is loaded improving the match of the R-F wave into the ferrite and also the R-F energy is concentrated near the ferrite. FIG. 3 shows an example of the field configurations within the transmission line of FIG. 5 for the configurations shown and the values described using material such as the Stycast Hi-K as dielectric 10 and the R4 ferrite material as ferrite 13. The magnetic field contours of waves propagated the parallel plane transmission line of FIG. 5 at a given time instant are illustrated in FIG. 4. FIG. 4 shows that the polarization varies across the width (y-direction) of the transmission line. For the configuration shown and described in connection with FIG. 5 and using the values and material given, a D.C. biasing magnetic field of approximately 685 oersteads is applied in the direction indicated by arrow 14 by a suitable source, represented in FIG. 5 as two permanent magnets 8 and 9, across the entire length (z-direction) of the ferrite material 13. The suitable source can be a permanent magnet, an electromagnet or as described later in the text a latching device. Electromagnetic waves are coupled into the dielectrically-loaded, parallel-plane transmisison line shown in FIG. 5 by means of a coaxial cable connector 7. The center conductor 15 acts as a coupling probe and is extended down a hole cut through the relatively high dielectric material 10 and the outer conductor of the connector 7 is connected to parallel plate 11. An end plate, not shown, is located to cover the input end of the transmission line along the y-axis to prevent radiation out of the end of the transmission line and enhance propagation through the transmission line. The electromagnetic energy is coupled out of the transmission line by a similar coaxial cable connector 5 and probe 6. Again an end plate, not shown, is located over the output end of the transmission line along the y-axis to prevent radiation out of the transmission line. The coupling of electromagnetic waves into and out of the dielectrically-loaded, parallel-plane transmission line via the connectors 5, 7 can be accomplished following any of the various known techniques that are used with conventional waveguides. Suitable means such as an adhesive are employed to fixedly mount the material 10 and ferrite 13 between the plates 11 and 12.

Figure 16:
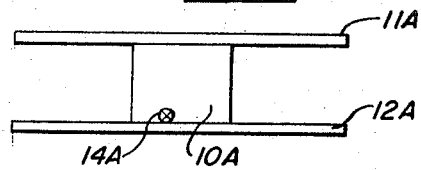

The phenomena associated with the motion of magnetic dipoles in ferrite materials in the presence of a constant magnetic field and a superimposed R-F magnetic field may be considered similar in many respects to the classical mechanical gyroscope. The D.C. magnetic forces acting on the spinning electron are comparable to the gravitational force acting on a mechanical top. In the case of the mechanical top, precession takes place about the gravitation axis. The precessional frequency depends on the spin of the top about its own axis and the gravitational force acting on the center of the mass of the top. In the case of the spinning electron, the gravitation force is replaced by the applied D.C. magnetic field. When the R-F magnetic field is applied perpendicular to the D.C. field, it exerts a periodic sidewise thrust or force. If this almost circularly polarized magnetic field rotates in an opposite direction to that of the precession, there is little interaction between the R-F magnetic field and the electrons, providing a first permeability ($\mu_-$). However, an R-F magnetic field which is rotating in the same direction as the electron has a stronger coupling because the field and the spin vector are parallel for a longer period during each revolution providing a second and different permeability ($\mu_+$). As described in connection with FIG. 4 the magnetic field vectors are almost circularly polarized in opposite directions on the opposite sides of the dielectric material 10. By placing a strip of ferrite 13 at the interface between the high dielectric 10 and air or other relatively low dielectric material and properly D.C. biasing this ferrite material with a magnetic field, a precessional frequency is developed in the ferrite medium upon exciting the transmission line with an applied R-F wave producing phase shifts per unit length which differ in accordance with the direction of wave propagation. This difference in phase shift for the two directions of propagation is called the differential phase shift. The amount of differential phase shift can be increased by also placing a second strip on the opposite side of the dielectric material 10 and D.C. biasing the two ferrite strips in opposite directions (using arrows marked $H_{D.C.}$ and $H'_{D.C.}$) as shown in FIGURE 4. In this manner the magnetic field vectors which appear elliptically polarized in opposite directions are more strongly acted upon by the ferrite strip providing a greater amount of differential phase shift. By biasing both strips of ferrite material 4 in FIGURE 4 in the same x-direction (using arrows marked $H_{D.C.}$ and $H''_{D.C.}$), a reciprocal phase shift can be provided. Referring to FIG. 16, a reciprocal phase shifter can be constructed by replacing the high dielectric material 10 of FIG. 5 centered between the two parallel planar conductors with a single piece of ferrite material 10A. This ferrite material has sufficient amount of high dielectric to provide the required dielectric loading between the parallel planes 11A and 12A. A D.C. magnetic field is applied longitudinally through the center of the ferrite material in the direction of propagation (indicated by arrow 14A pointing into the paper) changing the R-F permeability at the center of the transmission line. Consequently, a phase shifting operation results, which is similar to that described for rectangular waveguides in "Microwave Ferrites and Ferrimagnetics" by Lax & Button published by McGraw-Hill, wherein there is provided ferrite material at the center of the rectangular waveguide.

Figure 15:
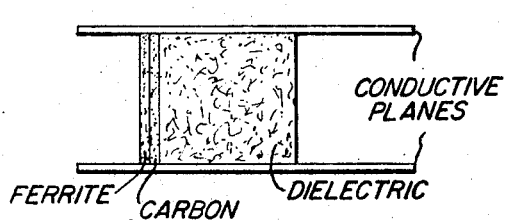
FIGURE 15 is a cross-sectional view of a dielectrically-loaded parallel-plate field displacement isolator and FIGURE 16 is a cross-sectional view of a reciprocal phase shifter.

Resonance isolators, field displacement isolators, circulators, modulators, radiators, and many other microwave devices known for use with waveguides and employing ferrite material can be duplicated. Using the techniques described above, a piece of ferrite placed at point P in FIG. 4 and magnetized as shown by the arrow marked $H_{D.C.}$ sees a magnetic field which is almost circularly polarized in a first direction when the wave moves from left to right and almost circularly polarized in an opposite direction when the wave moves from right to left. A resonant isolator can be provided by adjusting the D.C. magnetic field so as to make the material precessional frequency coincide with the frequency of the microwave signal. There is an absorption of the power associated with the resonance. The wave traveling from left to right is largely absorbed but a wave traveling from right to left would not be absorbed because there is no resonance for the negative circularly polarized fields. The field displacement isolator takes advantage of the difference between the two R-F permeabilities $\mu_+$ and $\mu_-$ for the two opposite senses of almost circular polarization of the magnetic fields. High permeabilities act like a high dielectric constant to cause more of the wave energy to be crowded into the material. Low permeability has the opposite effect and therefore more energy of the wave is contained in the ferrites for one direction of wave propagation than for the other. A film of carbon placed on the inner face of the ferrite between the ferrite and the high dielectric material will absorb a considerable amount of energy when the fields are crowded into the ferrite region but will absorb much less when the energy is forced out of the ferrite, see FIGURE 15. In practice for rectangular waveguides, it is found that a null in electric field can be created on the face of the ferrite slab by the proper value of the R-F permeability $\mu_+$ resulting in no energy being absorbed from a wave passing in one direction so that an isolator with almost no loss in the forward direction and large losses in the reverse direction can be realized. Using this technique known for rectangular waveguides in combination with the technique described above, a similar isolator may be constructed.

Figure 6:
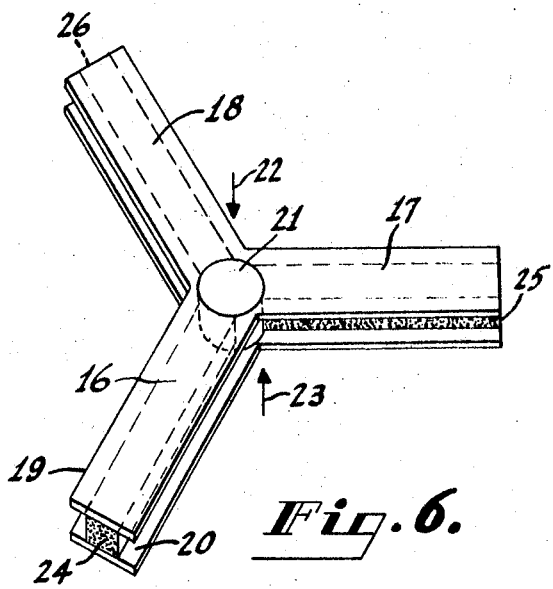
FIG. 6 is a dielectric-loaded, parallel-plane Y-junction circulator.

Junction type circulators can likewise be constructed according to the applicant's teaching by placing ferrite material at the junction of dielectrically-loaded, parallel-plane transmission lines. Operation of junction type circulators is similar to that described for rectangular waveguides as described by Fay and Comstock in IEEE Transactions on Microwave Theory and Technique, January 1965, pp. 15–27. FIG. 6 illustrates for example a Y-junction circulator which is constructed of dielectriaclly-loaded, parallel-plane transmission lines described above. Three pieces 16, 17 and 18 of suitable dielectric material are centered between two Y-shaped parallel planes 19 and 20. A suitable dielectric material for use at 9 gHz. may be, for example, magnesium titanate "Type D–16" sold by Trans-Tech of Gaithersburg, Md. This material has a dielectric constant of 16 and a dielectric loss tangent of 0.0002. At the junction of dielectric pieces 16, 17 and 18 is placed a circular disk of ferrite material 21. For example, a ferrite material identified as G–113 and manufactured by Trans-Tech may be suitable for operation at 9 gHz. When operated below resonance with the ferrite operated as described above, the ferrite is D.C. biased by a suitable source, not shown, of, for example, 230 oersteds in a direction normal to the plane of the ferrite as indicated by arrow 22. Using this arrangement an electromagnetic wave entering at arm 24 is directed 120° to arm 25. A wave entering at arm 25 is likewise directed from arm 25 to arm 26 and a wave at arm 26 is directed to arm 24. A suitable source for biasing the ferrite 21 may be of the type shown and described previously in connection with FIG. 5. Means for coupling R-F energy to and away from the circulator, not shown, may be also the same as that shown and described previously in conection with FIG. 5. The same wave can be directed above resonance in the same direction of circulation by the application of the correct amount of D.C. biasing in a reverse direction indicated by arrow 23.

Figure 7:
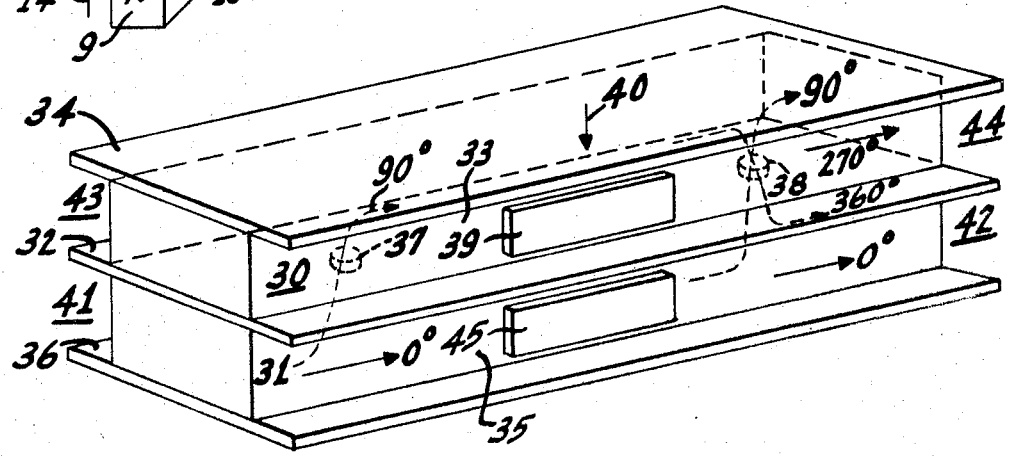
FIG. 7 is a perspective view of a 4-port circulator which includes two dielectric-loaded, parallel-plane transmission lines.

A 4-port circulator similar to that formed using rectangular waveguides can be provided using the configuration shown in FIG. 7. FIG. 7 is a perspective view of a 4-port circulator which is made of two dielectrically-loaded, parallel-plane transmission lines 30 and 31 stacked one above the other using a common parallel conducting plane 32. The upper transmission line 30 is made up of dielectric material 33 spaced between parallel conducting planes 34 and 32. The lower transmission line 31 is made up of dielectric material 35 spaced between parallel conducting planes 36 and 32. The dielectric material 33 and 35 may be of the type described in connection with FIG. 5. Coupling holes 37, 38 are provided in the common plate 32 of the two lines 30 and 31 to provide coupling between the lines. Coupling hole 37 is located on the one end of the stacked lines and coupling hole 38 is located on the opposite end of the stacked lines. An appropriate length of ferrite material 39 is affixed between the coupling holes 37, 38 to the dielectric material 33 of transmission line 30 so that upon application of a D.C. magnetic field in the direction as indicated by arrow 40, 180° more phase shift is provided in line 30 to the right toward port 44 than to the left toward port 43. The ferrite material and the D.C. biasing applied may be, for example, similar to that described in connection with FIG. 5. A piece of dielectric 45 is affixed between coupling holes 37, 38 to the piece of dielectric material 35 of line 31 which has the same dielectric constant as that of ferrite material 39 to match the reciprocal part of the phase shift provided by the ferrite material 39 in line 30. Electromagnetic waves are coupled into and out of the circulator at ports 41, 42, 43, and 44 by suitable coupling probes or other such means as are now used with rectangular waveguides as described in connection with FIG. 5 Upon the application of electromagnetic waves into transmission line 31 at port 41, the coupling hole 37 divides the electromagnetic wave in amplitude and couples one-half of the energy into transmission line 30 with a relative phase advance through the coupling hole of 90°. The energy coupled into transmission line 30 is applied through the appropriate ferrite material 39 so that when properly D.C. biased there is provided 180° more phase shift to the right toward port 44 in line 30 than to the left toward port 43 in line 30. Also there is provided 180° more phase shift to the right toward port 44 than to the right toward port 42 in line 31. At the second coupling hole 38, one-half of the energy from each of the transmission lines 30, 31 is coupled to the other of the transmission lines 30, 31 (indicated by dashed lines) with a relative phase advance in each case of 90°. In this manner one-half of the energy from transmission line 30 couples into transmission line 31 with a relative phase advance of 90° or a total relative phase advance of 360° (90°+180°+90°) and one-half of the energy from transmission line 31 couples into transmission line 30 for a 90° relative phase advance. The electromagnetic energy present at port 44 which presents a relative phase advance of 90° and 270° (90°+180°) suffers a destructive interference while the energy at port 42 which presents a relative phase advance of 0° and 360° (90°+180°+90°) interferes constructively. Since the electromagnetic energy that would emerge at 44 (indicated by dashed lines) suffers destructive interference, all of the energy or power amplitude emerges from port 42 which, for example, may be connected to an antenna. A signal entering port 42 will emerge entirely from port 43 because there is no net phase shift in transmission line 30 compared to transmission line 31 other than at the couplers 37, 38. Similar analysis will verify the rule of a circular: 41→42→43→44→41. A hybrid junction can be provided using a similar configuration to that of FIG. 7 by utilizing only one coupling hole. The energy entering at one port will appear at the two opposite ports with equal amplitude but with a 90° difference in phase due to the coupling hole.

Figure 8:
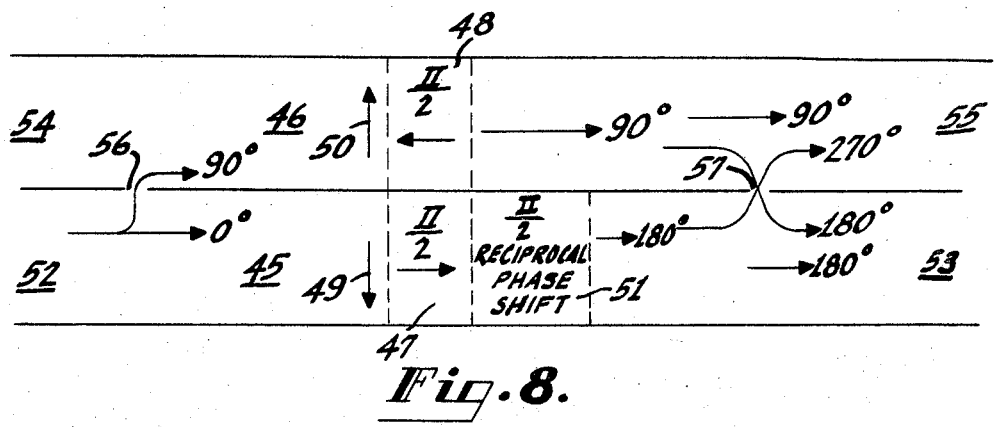
FIG. 8 is a schematic sketch of a 4-port circulator which includes a nonreciprocal 90° phase shifter in each transmission line.

A 4-port circulator can be made with two nonreciprocal 90° phase shift sections, one in each transmission line. FIG. 8 is a schematic sketch of a 4-port circulator with a 90° nonreciprocal phase shift in each transmission line. In this case, 90° phases shifter 47, 48 is located in each transmission line 45, 46. Phase shifters 47, 48 are oppositely magnetized by a proper D.C. magnetic field which may be applied in a similar manner to that described in connection with FIG. 5. The arrows 49, 50 in this schematic sketch indicate the drection of D.C. bias applied to the 90° (π/2) nonreciprocal ferrite phase shifters. These phase shifters may be constructed in a similar manner to that shown and described in connection with FIG. 5. In addition to the 90° (π/2) phase shifter, line 45 is provided with a reciprocal 90° (π/2) phase shifter 51. This reciprocal phase shifter may be constructed in the manner described previously wherein ferrite material is located on each side of the dielectric and the ferrite material on each side of the dielectric material is D.C. biased in the same direction. Coupling holes 56, 57 between the transmission lines 45, 46 are provided on either end of the 4-port circulator as shown in schematic form in FIG. 8. When the electromagnetic waves are coupled into port 52, the energy so provided is divided in amplitude so that one-half of the energy is coupled through coupling hole 56 causing a relative phase advance of 90° into transmission line 46 and one-half of the amplitude is phase shifted 180° in transmission line 45 through nonreciprocal phase shifter 47 and reciprocal phase shifter 51. At the second coupling hole 57, one-half of the energy from transmission line 45, 46 is coupled to the other of the transmission lines 45, 46 with a relative phase advance of 90°. In this manner one-half of the energy from transmission line 45 is coupled into transmission line 46 with a relative phase advance of 90° or a total relative phase advance of 270° and one-half of the energy from transmission line 46 couples into transmission line 45 for a 90° relative phase advance. The energy present at port 55 suffers a destructive interference (90° and 270°) while the energy at port 53 interferes constructively since the waves at port 53 are both phase shifted 180°. Since the energy which would emerge from port 55 suffers destructive interference, all of the energy and consequently the electromagnetic waves emerge from port 53 which may be connected to an antenna. A signal applied to port 53 will emerge from port 54 in a somewhat similar manner. The energy coupled into port 53 is divided so that one-half of the energy is coupled through coupling hole 57 and phase shifted through phase shifter 48 to provide a relative phase advance at port 54 of 180°. One-half of the energy applied at port 53 is phase shifted 90° through reciprocal phase shifter 51 to provide a relative phase advance of 90°. At the second coupling hole 56, one-half of the energy from transmission line 45, 46 is coupled into the other of the transmission lines 45, 46 with a relative phase advance of 90°. In this manner one-half of the energy from transmission line 46 is coupled into the transmission line 45 with a relative phase advance of 90° or a total relative phase advance of 270° at port 52. One-half of the energy from transmission line 45 couples into transmission line 46 for a 90° relative phase advance or a total relative phase advance of 180°. The energy present at port 52 suffers a destructive interference while the energy at port 54 interferes constructively. Since the energy present at port 52 suffers destructive interference, all the energy and consequently electromagnetic waves emerge from port 54. A signal applied at port 54 will in a somewhat similar manner emerge from port 55. Signal energy applied at port 54 will be divided so that one-half of the signal energy is coupled through coupling hole 56 and phase shifted through phase shifters 47 and 51 to provide a relative phase advance of 270°. One-half of the signal energy is applied directly toward port 55 without any relative phase shift. At the second coupling hole 57 one-half of the energy from transmission line 45 is coupled to transmission line 46 with a relative phase advance of 90° or a total relative phase advance of 360° (270°+90°). One-half of the energy from transmission line 46 is coupled into transmission line 45 with a relative total phase advance of 90°. The energy located at port 53 suffers a destructive interference (90° and 270°) while the waves at port 55 interfere constructively (360° and 0°). Since the waves that would emerge from port 53 suffer destructive interference, all the energy and consequently the electromagnetic waves emerge from port 55. In a similar manner to that described above, signal energy applied at port 55 is divided so that one-half of the energy is phase shifted 90° through phase shifter 48. One-half of the energy is coupled through coupling hole 57 and applied through reciprocal phase shifter 51 to provide a combined relative phase advance of 180°. At the second coupling hole 56 one-half of the energy from transmission line 46 is coupled into transmission line 45 to provide a relative phase advance of 180° and one-half the energy from transmission line 45 is coupled to transmission line 46 to provide a relative phase advance of 90° or a total phase advance of 270°. The energy present at port 54 suffers destructive interference while the wave energy at port 52 interferes constructively. Since the wave energy present at port 54 suffers destructive interference, all the energy and consequently the electromagnetic waves emerge from port 52. In this manner it can be seen how a circulation 52→53→54→55→52 can be provided.

Figure 9:
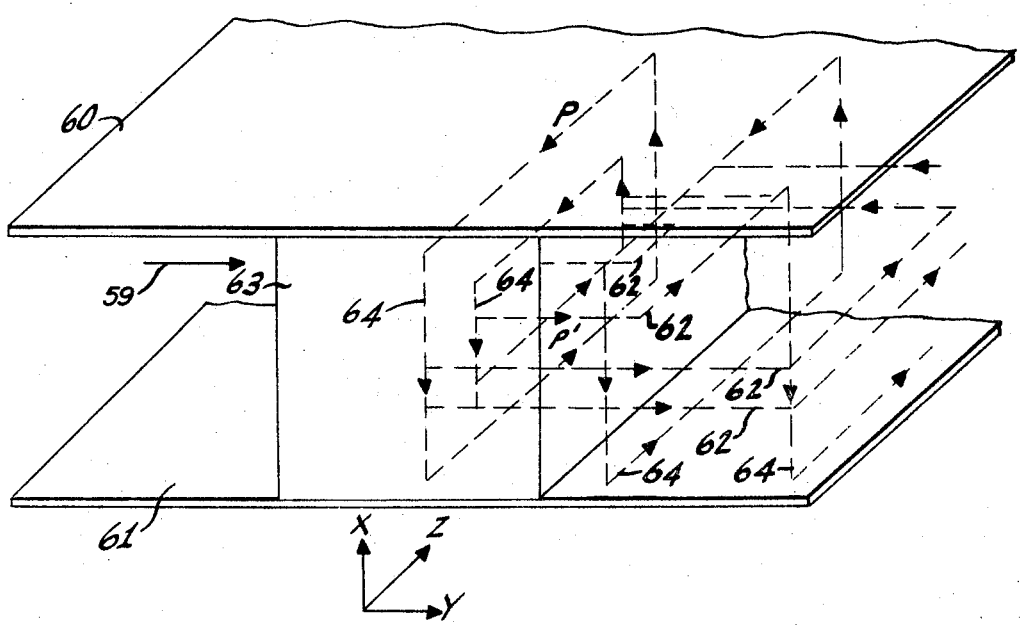
FIG. 9 is a view of some of the field lines for a hybrid $HE_{11}$ mode of a dielectically-loaded, parallel-plane transmission line.

A higher order propagating mode of the hybrid type is propagated through the dielectrically-loaded, parallel-plane transmission line when the spacing between the parallel planes is made larger so that one-half wave variation of the R-F field is possible between the planes. FIG. 9 illustrates some of the R-F field lines of the hybrid mode propagating between parallel conducting plates 60, 61 and dielectric 63 when the spacing between the plates is made so that one-half wave variation is possible between the plates.

Figure 10:
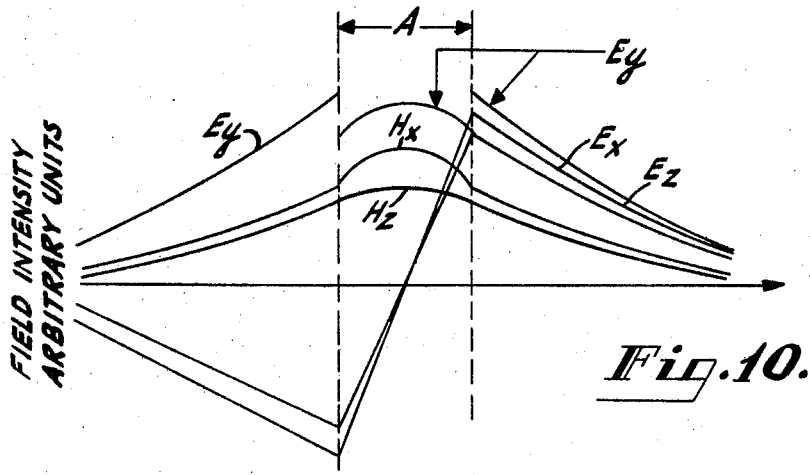
FIG. 10 illustrates the relative field magnitudes of the electric ($E_x$, $E_y$, $E_z$) and magnetic ($H_x$, $H_z$) field components for a hybrid $HE_{11}$ mode of a dielectrically-loaded parallel-plane transmission line.
Figure 11:
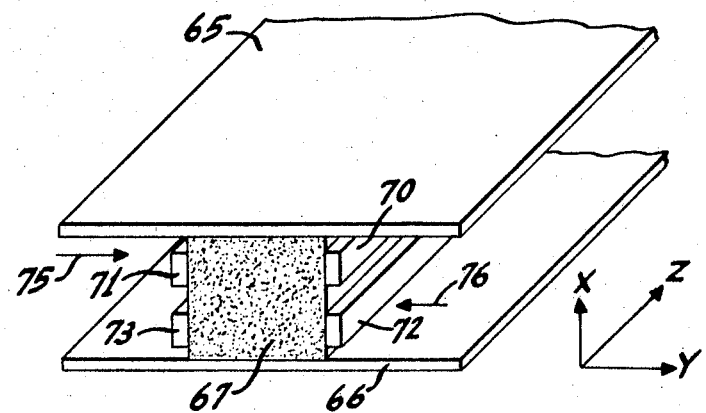
FIG. 11 is a perspective view of a dielectrically-loaded, parallel-plane differential phase shifter for use with hybrid $HE_{11}$ modes.

In FIG. 9 the only electric field lines 62 shown are those located on one side of the center of the dielectric material 63 and those that run only in the y-z directions. The magnetic field lines 64 shown in FIG. 9 run in the x-z directions. Only the magnetic field lines 64 on one side of dielectric material 63 are shown. By viewing the magnetic field lines 64 from the y-direction as indicated by arrow 59, the magnetic field lines 64 are similar to those shown in FIG. 4 so that an observer at point P near the top plate 60 sees magnetic field vectors which are rotating almost circular in a first direction and an observer at point P' near the bottom plate 61 sees magnetic field vectors which are rotating almost circular in an opposite direction for an electromagnetic wave propagating in the same z-direction. A strip of ferrite material may be placed next to the dielectric material 63 along the z-axis about one-quarter of the distance removed from either the upper conducting plate 60 or lower conducting plate 61. Upon the application of electromagnetic waves and the proper biasing of the ferrite material with D.C. magnetic field ($H_{D.C.}$) in the y-direction, devices similar to microwave components in rectangular waveguides which employ ferrite materials can be duplicated using the techniques described previously. FIG. 10 illustrates the relative field magnitudes of the electric ($E_x$, $E_y$, $E_z$) and magnetic ($H_x$, $H_z$) field components in cross-section. FIG 10 indicates that the magnetic field intensities ($H_x$, $H_z$) are located principally and are cosinusoidal in the region A containing the high dielectric material 63 and that the field outside the dielectric region A decays exponentially so little R-F energy is located at a short distance away from region A. FIG. 11 is a perspective view of a dielectrically-loaded, parallel-plane transmission line which can support a hybrid $HE_{11}$ mode, providing the height between the parallel plates 65, 66 is large enough in the x-direction so that the hybrid mode is not cut off. A rectangular piece of low loss dielectric material 67 of relatively high dielectric constant is centered along the y-direction and placed between parallel plates 65, 66. The dielectric material may be similar to that described in connection with FIG. 5. The dimension of the dielectric material 67 in the y-direction is made sufficiently small to cut-off the antisymmetrical $TE_{20}$ mode. The dielectric material 67 is placed along the center line for the entire length of the transmission line in the z-direction. As described above in connection with FIG. 9, the R-F magnetic field vectors about one-quarter of the distance removed from the upper and lower conducting plates 65, 66 are almost circularly polarized in opposite directions for a wave propagating in the same z-direction. FIG. 11 illustrates strips of ferrite material 70, 71, 72, 73 which are placed at a position about one-quarter of the distance removed from the upper and lower conducting planes to interact with the almost circularly polarized magnetic field vectors and to produce similar effects to those obtained for $TE_{10}$ modes in rectangular waveguides. A D.C. magnetic field ($H_{D.C.}$) is applied, for example, in the y-direction indicated by arrow 75 for the upper ferrite strips 70, 71 and in the opposite y-direction indictaed by arrow 76 for the lower ferrite strips 72, 73. The energy coupled into and out of the transmission line shown in FIGURE 11 may be by means of coupling probes (not shown) such as those illustrated and described in connection with FIG. 5. The D.C. magnetic field can be provided by an electromagnet, a permanent magnet or a latching device as described in connection with FIG. 5. Upon the application of an electromagnetic wave to the transmission line shown in FIG. 11 and upon application of proper D.C. magnetic field biasing in the y-direction, a differential phase shifter similar to that described in FIG. 5 can be provided for operation in the hybrid $HE_{11}$ mode. Using the techniques described in this application, other devices such as various other forms of circulators, isolators, radiators, and filters can be provided using the above described technique.

The hybrid ($HE_{11}$) mode can be made the dominant mode using the configuration known as trough waveguide as shown in FIG. 12. A trough waveguide is similar to that described above in FIG. 11. By placing a conducting plate through the center of the relatively high dielectric 67 shown in FIG. 11 only half of the waveguide need be used. FIG. 9 illustrates some of the R-F field lines possible between the plates 80 and 81. FIG. 12 is a cross-sectional view of such a trough waveguide wherein there is provided a conducting plate 78 added through the dielectric material 79. Using this configuration, only half of the guide need be provided. The R-F magnetic field vectors $H_x$, $H_z$ at about one-quarter of the distance removed from both the upper and lower conducting plates 80, 81 are almost circularly polarized at this location. Ferrite strips 82, 83 are placed at this position to interact with these R-F magnetic field vectors. Upon the application of electromagnetic waves to this line and upon application of the appropriate amount of D.C. magnetic bias in the directions indicated by arrows 84, 85 to interact with these R-F magnetic fields, effects similar to those obtained for the $TE_{10}$ mode in rectangular waveguides are produced. The D.C. biasing may be provided in the manner shown and described in connection with FIG. 5. The electromagnetic energy can be coupled into and out of the trough waveguide by the means described in connection with FIG. 5. The dimension of the dielectric material 79 in the y-direction is made sufficiently small to cut off the antisymmetrical $TE_{20}$ mode. Using the techniques described above, it can be seen that by this teaching, ferrite phase shifters, circulators, isolators and various other types of microwave ferrite components known or described in this application can be provided.

Dielectrically-loaded, parallel-plane transmission lines as described in the embodiments above can also be made to act as radiators. For example, an end fire radiator can be provided by placing a window or slot in the end of the transmission line. Coupling to this type of transmission line can be done by using means similar to those known and described with rectangular waveguides; for example, the use of slots located near the high dielectric material or coupling loops located near the high dielectric material. Since attenuation of the R-F wave is possible using techniques described above, modulation can likewise be effected by varying the field during the magnetization process.

The device mentioned above and other similar devices which operate similar to the $TE_{10}$ mode in rectangular waveguide can be latched. FIG. 13 is a sketch of a closed loop of ferrite material 90 in cross-section. FIG. 13 shows a closed magnetic flux path located in a trough waveguide. A relatively high dielectric material 91 is bordered by parallel conducting planes 92, 93 and normal conducting plate 94. Part of the closed loop of ferrite material 90 borders the interface between the high dielectric material 91 and the air or lower dielectric material. The closed magnetic loop of ferrite material 90 is magnetized by applying a D.C. pulse supplied by an external pulse current source (not shown) through wire or wires 95 in the ferrite enclosure which extends the longitudinal length of the ferrite to provide a magnetic flux path about the ferrite loop. Sufficient current is applied to produce a magnetizing force which magnetizes the ferrite sufficiently to saturate the ferrite. Termination of the D.C. pulse reduces the magnetizing force to zero. The ferrite remains magnetized (latching at remanance) because the magnetic path is closed entirely within the magnetic material and there is little or no demagnetizing effects. The ferrite should have an almost square hysteresis loop so that the residual flux density will approximate the saturation value when the D.C. pulse current is removed. Thus, the D.C. pulse latches the ferrite to provide the internal D.C. magnetic flux density required for operation of ferrite devices and no external magnet is required.

By arranging the loop of ferrite material 90 so that the top plane of the loop of ferrite is about one-fourth the distance from the top parallel plane 92 and so that the bottom plane of the ferrite loop is about one-fourth of the distance from the bottom plane 93, the ferrite is D.C. biased by its own internal field and opposite directions at the points of opposite circular polarization. As illustrated in FIG. 12 and described above in connection with the trough waveguide supporting the $HE_{11}$ mode, a similar device as those obtained in rectangular waveguide operating in the $TE_{10}$ mode can be made for the dielectrically loaded trough waveguide supporting the hybrid $HE_{11}$ mode when a D.C. bias is provided in the y-direction during the application of electromagnetic energy. If one desires to reverse the direction of magnetization, a D.C. pulse supported by a suitable current source in the opposite direction is all that is necessary. Coupling into and out of the trough waveguide may be provided in the manner shown and described in connection with FIG. 5. Using the above latching technique, permanent magnets become unnecessary and differential phase shifters, isolaters, and circulators with light weight features are possible using this technique in combination with the teachings above. For example, dielectric-loaded, parallel-plane transmission lines like that shown in FIG. 11 which support the hybrid $HE_{11}$ mode can be constructed as a latching device by placing a similar closed magnetic loop of ferrite material at the respective dielectric-air interfaces.

The $TE_{10}$ mode can be latched likewise, for example, by arranging a loop of ferrite material so that the ferrite is D.C. biased by its own internal field. FIG. 14 illustrates an example of a dielectric-loaded, parallel-plane transmission line latching ferrite material for use with the fundamental $TE_{10}$ mode. A piece of low loss high dielectric material 100 is placed between parallel conducting planes 101, 102. A strip of ferrite 103 is placed on one side of the dielectric material 100 and a strip of ferrite 104 is placed on the opposite side of the dielectric material 100. A strip of ferrite 105 or other such magnetic flux conductive material is placed on the outside of the conducting plate 101 and a second strip of ferrite or other such magnetic flux conductive material 106 is placed on the outside of conducting plate 102. By making the plates 101, 102 thin at the points where the ferrites 104, 103 meet the conducting plates 101, 102 so that the magnetic flux conducting paths 105, 106 are coupled to the ferrites 104, 103, a closed magnetic loop of ferrite material is provided. A wire 107 is placed inside this closed magnetic loop of ferrite (103, 104, 105, 106). The wire 107 extends the entire longitudinal length of the ferrite loop. By placing a pulse of current through the wire from a current generating source (not shown), a magnetic flux path about the ferrite loop is developed and the ferrites 103, 104 are D.C. biased by their own internal field.

There are various suitable circuits that may be used above for supplying the desired current pulse through the magnetizing loop of these microwave devices. One suitable circuit is shown and described in copending application, Ser. No. 523,372, by Siekanowitz et al., filed Jan. 27, 1966 and now issued as Patent No. 3,350,663. The latching techniques described by the applicant are similar to those shown and described in the copending applicaion for latching ferrite circulators.

It is to be understood that the above described arrangements are illustrative of the application of the principles of the invention. Numerous other arrangements may be devised by those skilled in the art without departing from the spirit and scope of the invention. Moreover, the invention is not limited to the particular details of construction, materials and processes described, as many equivalents will suggest themselves to those skilled in the art.

What is claimed is:
1. In combination,
a first planar conductor,
a second planar conductor spaced from said first planar conductor,
a piece of material having a high dielectric constant of at least 10 compared to the dielectric constant of air disposed between said planar conductors with said piece flanked on at least two of its opposite free sides by a region of lower dielectric material located between said planar conductors, said planar conductors being spaced and the dimensions and dielectric constants of said high dielectric material and said low dielectric material being determined to cause an R-F field having an exponential decay at said opposite free sides to minimize radiation and having a longitudinal magnetic field component to be launched along said planar conductors in the presence of an applied electromagnetic wave,
a piece of ferrite material positioned adjacent to said high dielectric material,
said ferrite material exhibiting a gyromagnetic effect upon the application of said R-F field and upon the application of a D.C. magnetic field orthogonal to said R-F magnetic field, and means for supplying said D.C. magnetic field orthogonal to said R-F magnetic field.

2. The combination as claimed in claim 1 and wherein said means for supplying said D.C. magnetic field is a latching device.

3. In combination,
a first planar conductor,
a second planar conductor spaced from said first planar conductor,
a piece of high dielectric material having a high dielectric constant of at least 10 compared to the dielectric constant of air disposed between said planar conductors with said piece flanked on at least two of its opposite free sides by a region of low dielectric material located between said planar conductors, said planar conductors being spaced and the dimensions and dielectric constants of said high dielectric material and of said low dielectric material being determined to cause an R-F field having an exponential decay at said opposite sides to minimize radiation and having a longitudinal magnetic field component to be launched along said planar conductors in the presence of an applied electromagnetic wave thereby establishing a magnetic field between said conductors having magnetic field vectors which are substantially circularly polarized in opposite senses as viewed perpendicularly to the direction of propagation of said component along said conductors,
a piece of ferrite material which exhibits a gyromagnetic effect positioned adjacent to said high dielectric material, and
means for biasing said ferrite material to interact with said magnetic field.

4. In combination,
a first planar conductor,
a second planar conductor parallel to and equally spaced from said first planar conductor,
a rectangular piece of high dielectric material having a dielectric constant of at least ten compared to the dielectric constant of air disposed between said planar conductors with said piece flanked on two of its opposite sides by a region of low dielectric material located between said planar conductors, said planar conductors being spaced and the dimensions and dielectric constants of said high dielectric material and of said low dielectric materials being determined to cause an R-F field having an exponential decay at said opposite sides to minimize radiation beyond said conductors and having a longitudinal magnetic field component to be launched along said planar conductors in the presence of an applied electromagnetic wave establishing an R-F magnetic field between said planar conductors having magnetic field vectors which are substantially circularly polarized in one sense when viewed at one of said opposite sides and in the opposite sense when viewed at another of said opposite sides,
a separate strip of ferrite material which exhibits a gyromagnetic effect positioned at each of said two opposite sides between said high and low dielectric materials, and
means for biasing said ferrite material to interact with said R-F magnetic field.

5. A nonreciprocal differential phase shifter device comprising,
a first planar conductor,
a second planar conductor parallel to and equally spaced from said first planar conductor,
a piece of high dielectric material having a dielectric constant of at least ten compared to the dielectric constant of air disposed between said planar conductors with said piece flanked on at least two of its opposite free sides by a region of low dielectric material located between said planar conductors, said planar conductors being spaced and the dimensions and dielectric constants of said high dielectric material and of said low dielectric material being determined to cause an R-F field having an exponential decay at said free sides to minimize radiation beyond said conductors and having a longitudinal magnetic field component to be launched along said conductors in the presence of an applied electromagnetic wave establishing an R-F magnetic field between said conductors having magnetic field vectors which are substantially circularly polarized in one sense when viewed at one of said sides and in the opposite sense when viewed at the opposite of said sides,
a first strip of ferrite material which exhibits a gyromagnetic effect positioned at one of said free sides,
a second strip of ferrite material which exhibits a gyromagnetic effect positioned at the other of said free sides,
means for biasing said first strip of ferrite material in one direction to interact with the said magnetic field having vectors which are substantially circularly polarized in said one sense, and
means for biasing said second ferrite material in an opposite direction to interact with said magnetic field having vectors which are substantially circularly polarized in said opposite sense, whereby the action of said biasing means causes the presence of said ferrite strips to interact with said magnetic field in a nonreciprocal manner.

6. In combination,
a first planar conductor,
a second planar conductor parallel to and equally spaced from said first planar conductor,
a piece of high dielectric material having a dielectric constant of at least ten compared to the dielectric constant of air disposed between said planar conductors with said piece flanked on at least two of its opposite free sides by a region of low dielectric material located between said planar conductors, said piece of high dielectric material and said low dielectric material having dielectric constants and dimensions to produce along said conductors energy in a dominant $TE_{10}$ mode having an exponential decay at said free sides to minimize radiation beyond said conductors and being similar to the $TE_{10}$ mode in rectangular waveguide upon the application of an electromagnetic wave to said conductors establishing an R-F magnetic field between said conductors having magnetic field vectors which are substantially circularly polarized in one sense when viewed at one of said sides and in the opposite sense when viewed at the opposite of said sides, a ferrite slab positioned at one of said sides of said high dielectric material, said ferrite exhibiting a gyromagentic effect upon the application of said R-F magnetic field and upon the application of a D.C. magnetic field orthogonal to said R-F magnetic field, and means for supplying said D.C. magnetic field orthogonal to said R-F magnetic field.

7. In combination, a first planar conductor, a second planar conductor parallel to and equally spaced from said first planar conductor, a piece of high dielectric material having a dielectric constant of at least ten compared to the dielectric constant of air disposed between said planar conductors with said piece flanked on at least two of its opposite free sides by a region of low dielectric material located between said planar conductors, said planar conductors being spaced so that at least one-half wavelength at a desired frequency is supported between said planar conductors, said high dielectric material and said low dielectric material having dimensions and dielectric constants to produce along said conductors energy in a hybrid $HE_{11}$ mode at said desired frequency having an exponential decay at said free sides to minimize radiation beyond said conductors in the presence of an applied electromagnetic wave establishing an R-F magnetic field between said conductors having magnetic field vectors which are substantially circularly polarized in one sense when viewed near said first conductor at one of said sides and is substantially circularly polarized in the opposite sense when viewed near said second conductor at said same side, a first ferrite strip positioned between said planar conductors at one of said sides and near said first planar conductor, a second strip of ferrite positioned between said planar conductors at same side and near said second planar conductor, said ferrite exhibiting a gyromagnetic effect upon the application of said R-F magnetic field and upon the application of a D.C. magnetic field orthogonal to said R-F magnetic field, and means for supplying said D.C. magnetic field orthogonal to said R-F magnetic field.

8. A reciprocal phase shift device comprising, a first planar conductor, a second planar conductor parallel to and equally spaced from said first planar conductor, a piece of high dielectric material having a dielectric constant of at least ten compared to the dielectric constant of air disposed between said planar conductors with said piece flanked on at least two of its opposite free sides by a region of low dielectric material located between said planar conductors, said planar conductors being spaced and the dimensions and dielectric constants of said high dielectric material and said low dielectric material being determined to cause an R-F field having an exponential decay at said free sides to minimize radiation beyond said conductors and having a longitudinal magnetic field component to be launched along said conductors in the presence of an electromagnetic wave establishing an R-F magnetic field between said conductors having magnetic field vectors which are substantially circularly polarized in one sense when viewed at one of said free sides and in the opposite sense when viewed at the opposite of said free sides, a first strip of ferrite material which exhibits a gyromagnetic effect positioned at one of said free sides, a second strip of ferrite material which exhibits a gyromagnetic effect positioned at the other of said free sides, means for biasing said first strip of ferrite material in one direction to interact with said R-F magnetic field having vectors which are substantially circularly polarized in said one sense, and means for biasing said second strip of ferrite material in the same direction to interact with said magnetic field having vectors which are substantially circularly polarized in said opposite sense, whereby the action of said biasing means cause the presence of said ferrite strip to interact with said R-F magnetic field in a reciprocal manner.

9. An isolator comprising in combination, a first planar conductor, a second planar conductor spaced from said first planar conductor, a piece of high dielectric material having a dielectric constant of at least ten compared to the dielectric constant of air disposed between said planar conductors with said piece flanked on at least two of its opposite free sides by a region of low dielectric material located between said planar conductors, said planar conductors being spaced and the dimensions and dielectric constants of said high dielectric material and said low dielectric material being determined to cause an R-F field having an exponential decay at said free sides to minimize radiation beyond said conductors and having a longitudinal magnetic field component to be launched between said conductors in the presence of an electromagnetic wave establishing an R-F magnetic field between said conductors having magnetic field vectors which are substantially circularly polarized in one sense when viewed at one of said free sides and in the opposite sense when viewed at the opposite of said free sides, a strip of ferrite material which exhibits a material precessional frequency positioned at one of said free sides of said high dielectric constant material, and means for biasing said ferrite material so as to make said material precessional frequency coincide with the frequency of said electromagnetic wave whereby an electromagnetic wave traveling in only one direction along said conductors is largely absorbed.

10. A resonance isolator comprising in combination, a first planar conductor, a second planar conductor parallel to and equally spaced from said first planar conductor, a piece of high dielectric material having a dielectric constant of at least ten compared to the dielectric constant of air disposed between said planar conductors with said piece flanked on at least two of its opposite free sides by a region of low dielectric material located between said planar conductors, said piece of high dielectric material and said low dielectric material having dielectric constants and dimensions to produce along said conductor energy in the dominant $TE_{10}$ mode having an exponential decay at said free sides to minimize radiation beyond said conductors and being similar to the $TE_{10}$ mode in rectangular waveguide upon the application of an electromagnetic wave establishing an R-F magnetic field between said conductors having magnetic field vectors which are substantially almost circularly polarized in one sense when viewed at one of said sides and in the opposite sense when viewed at the opposite of said sides, a ferrite slab which exhibits a material precessional frequency positioned at one of said sides of said high dielectric material, and means for biasing said ferrite material so as to make said material precessional frequency coincide with the frequency of said electromagnetic wave whereby an electromagnetic wave traveling in only one direction along said conductor is largely absorbed.

11. A resonance isolator comprising,
a first planar conductor,
a second planar conductor parallel to and equally spaced from said first planar conductor,
a piece of high dielectric material having a dielectric constant of at least ten compared to the dielectric constant of air disposed between said planar conductors with said piece flanked on at least two of its opposite free sides by a region of low dielectric material located between said planar conductors, said planar conductors being spaced so that at least one-half wavelength at a desired frequency supported between said planar conductors, said high dielectric material and said law dielectric material having dimensions and dielectric constants to produce along said conductors energy in a hybrid $HE_{11}$ mode at said desired frequency having an exponential decay at said free sides to minimize radiation beyond said conductors in the presence of an applied electromagnetic wave establishing an R-F magnetic field between said conductors having magnetic field vectors which are substantially circularly polarized in one sense when viewed near said first conductor at one of said sides and is substantially circularly polarized in the opposite sense when viewed near said second conductor at said same side,
a first ferrite strip which exhibits a material precessional frequency positioned between said planar conductors at one of said sides and near said first planar conductor, and
means for biasing said ferrite material so as to make said material precessional frequency coincide with the frequency of said electromagnetic wave whereby an electromagnetic wave traveling in only one direction along said conductors is largely absorbed.

12. A field displacement isolator comprising,
a first planar conductor,
a second planar conductor parallel to and equally spaced from said first planar conductor,
a piece of high dielectric material having a dielectric constant of at least ten compared to the dielectric constant of air disposed between said planar conductors, said piece flanked on at least two of its opposite free sides by a region of low dielectric material located between said planar conductors, said planar conductors being spaced and the dimensions and dielectric constants of said high dielectric material and of said low dielectric material being determined to cause an R-F field having an exponential decay at said opposite sides to minimize radiation beyond said conductors and having a longitudinal magnetic field component to be launched along said conductors in the presence of an applied electromagnetic wave establishing an R-F magnetic field between said conductors having magnetic field vectors which are substantially circularly polarized at one sense when viewed at one of said opposite sides and in the opposite sense when viewed at another of said opposite sides,
a ferrite slab which exhibits gyromagnetic effects positioned at one of said two sides near opposite free sides, a resistive material positioned near said ferrite slab, the dimensions of said ferrite slab and a certain magnetization of said ferrite slab being determined so said R-F field of a signal propagated between said conductors in one direction is concentrated in the region of said resistive material, and
means for biasing said ferrite slab with said certain magnetization.

13. A circulator comprising,
a plurality of dielectric-loaded, parallel-plane transmission lines coupled together at a common point, each line including a piece of high dielectric material having a dielectric constant of at least ten compared to the dielectric constant of air disposed between two parallel planar conductors with said piece flanked on at least two of its opposite free sides by a region of low dielectric material located between said planar conductors, said planar conductors being spaced and the dimensions and dielectric constants of said high dielectric material and of said low dielectric material being determined to cause an R-F field having an exponential decay at said sides to minimize radiation beyond said lines and having a longitudinal magnetic field component to be launched along said conductors in the presence of an applied electromagnetic wave establishing an R-F magnetic field between said conductors having magnetic field vectors which are substantially circularly polarized at one sense when viewed at one of said sides and in the opposite sense when viewed at the opposite of said sides,
at least one body of ferrite material which exhibits gyromagnetic effects disposed at said common point between said transmission lines, and
means magnetizing said ferrite in a direction transverse to the direction of propagation of said electromagnetic wave component and with a strength and polarity such that waves conducted by each of said lines couple only to one other of said lines in a nonreciprocal manner.

14. A circulator comprising,
two dielectric-loaded, parallel-plane conductors, said parallel plane transmission line being orientated so that a first of these lines is stacked above the other by a common parallel conducting plate, each line including a piece of high dielectric material having a dielectric constant of at least ten compared to the dielectric constant of air disposed between two planar conductors with said piece flanked on at least two of its opposite free sides by a region of low dielectric material located between said planar conductors and said planar conductors being spaced and the dimensions and dielectric constants of said high dielectric material and said low dielectric material being determined to cause an R-F field having an exponential decay at said free sides to minimize radiation by said lines and having a longitudinal magnetic field component to be launched along said conductors in the presence of an applied electromagnetic wave,
a first coupling hole located in said common parallel conducting plate at one end of said transmission lines,
a second coupling hole located in said common parallel conducting plate at the opposite end of said transmission lines,
said first parallel plane conductors having at least one body of ferrite material disposed between said parallel planes, and
means for biasing said ferrite body nonreciprocally in a direction transverse to the direction of propagation of said electromagnetic wave with a strength such that waves applied to a first port of said transmission lines couple only to one other of said ports in a nonreciprocal manner.

15. A circulator as claimed in claim 14 and wherein a second, third and fourth body of ferrite material are disposed between the parallel planes of said second parallel plane conductors, said second body of ferrite material placed on one of said opposite free sides of said dielectric, and said third and fourth body of ferrite material placed on said opposite free sides of said dielectric material and both displayed equally from said second body, means for biasing said second, third and fourth bodies in an opposite direction to the direction in which said first body is biased with a strength such that said second body acts to couple electromagnetic waves applied thereto in a nonreciprocal manner and said third and fourth bodies together act to couple electromagnetic waves applied thereto in a reciprocal manner.

16. A reciprocal phase shifter device comprising:
a first planar conductor,
a second planar conductor parallel to and equally spaced from said first planar conductor,
a piece of ferrite material having a dielectric constant of at least 10 compared to the dielectric constant of air disposed between said planar conductors and with said piece flanked on at least two of its opposite free sides by a region of low dielectric material located between said planar conductors, said ferrite material having an R–F permeability below that of its magnetically saturated condition, said planar conductors being spaced and the dimensions and the dielectric constant of said ferrite material and said low dielectric material being determined to cause an R–F field having an exponential decay at said opposite free sides to minimize radiation beyond said conductors and having an R–F magnetic field with an R–F field component in both the longitudinal and transverse direction to be launched along said planar conductors in the presence of an applied electromagnetic wave, and means for biasing said ferrite material by applying a D.C. magnetic field in the longitudinal direction through the ferrite to change the R–F permeability of said magnetic material.

References Cited

UNITED STATES PATENTS

| | | | |
|---|---|---|---|
| 2,849,684 | 8/1958 | Miller | 333—1.1 |
| 2,849,685 | 8/1958 | Weiss | 333—1.1 |
| 2,937,346 | 5/1960 | Crowe | 333—24.1 |
| 2,951,220 | 8/1960 | Miller | 333—24.1 |
| 3,016,495 | 1/1962 | Tien | 333—1.1X |

OTHER REFERENCES

The Bell System Technical Journal, Nov. 1963, pp. 2642–2644 relied on, 333–95.

Cohn: *Propagation in a Dielectric-Loaded Parallel Plane Waveguide*, IRE Trans. on MTT, April 1959, pp. 202 and 206 relied on.

Sylvania Ferrite Devices Handbook, Sylvania Elec., Mountain View, Calif., Jan. '63, pp. 20, 21, 24 and front and back covers relied on, copy on Examiner's desk.

Reindel: *The H-Guide—A Useful Waveguide For Millimeter Waves*, AD 265851, Aug. 1961, pp. 1–6, 17, 21–23, 30 and title page relied on, 333–95.

HERMAN KARL SAALBACH, *Primary Examiner*.

PAUL L. GENSLER, *Examiner*.

U.S. Cl. X.R.

332—51

UNITED STATES PATENT OFFICE
CERTIFICATE OF CORRECTION

Patent No. 3,425,001 January 28, 1969

Bernard Hershenov

It is certified that error appears in the above identified patent and that said Letters Patent are hereby corrected as shown below:

Column 18, lines 29, 53 and 65, "conductors", each occurrence should read -- conductor transmission line --; line 30, "line" should read -- lines --; lines 66 and 68, before "dielectric", each occurrence, insert -- high --.

Signed and sealed this 7th day of April 1970.

(SEAL)
Attest:

Edward M. Fletcher, Jr.  
Attesting Officer

WILLIAM E. SCHUYLER, JR.  
Commissioner of Patents